Oct. 13, 1959 P. M. F. ZENS ET AL 2,908,365
CHANGE SPEED MECHANISM IN GEAR BOXES
Filed March 29, 1955 3 Sheets-Sheet 1
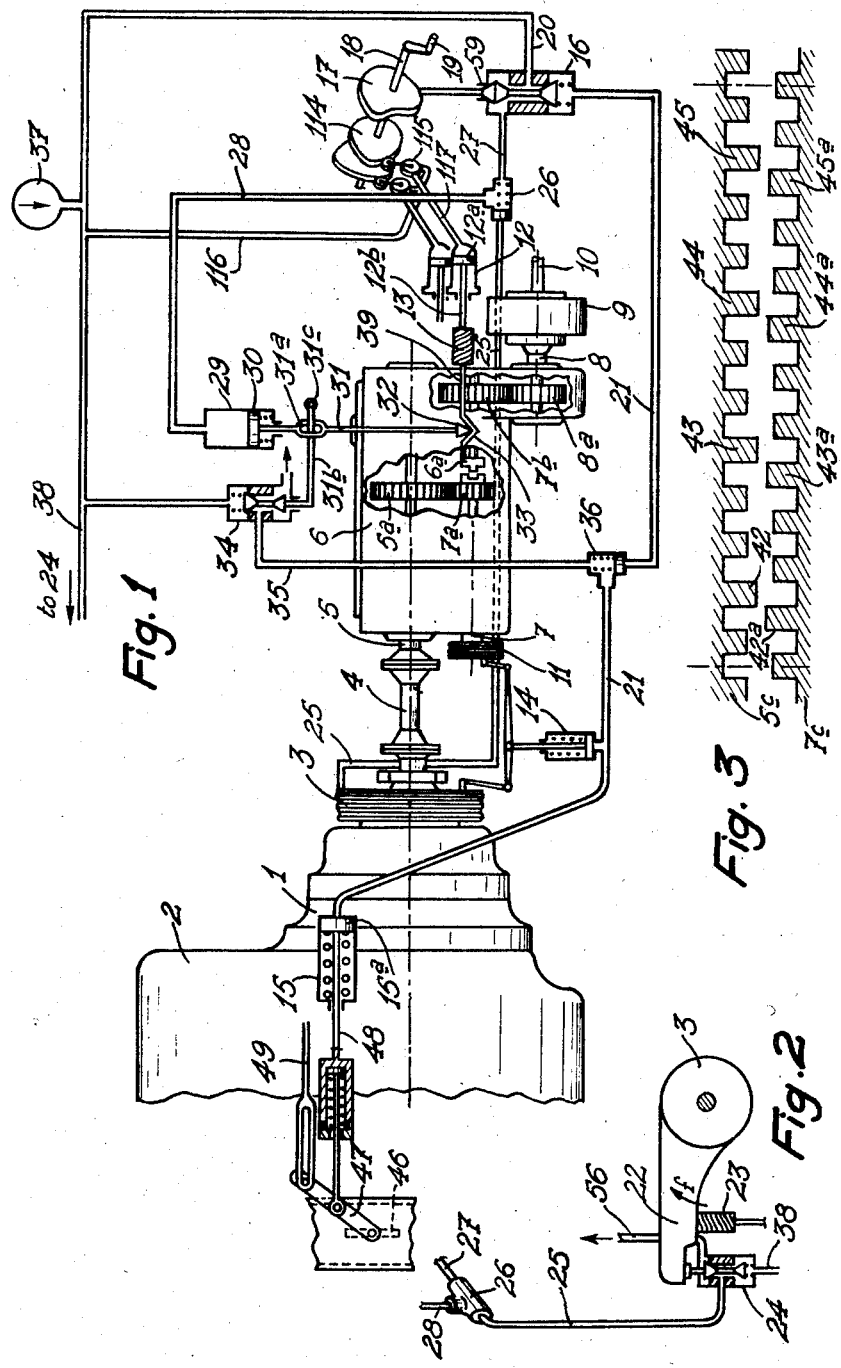

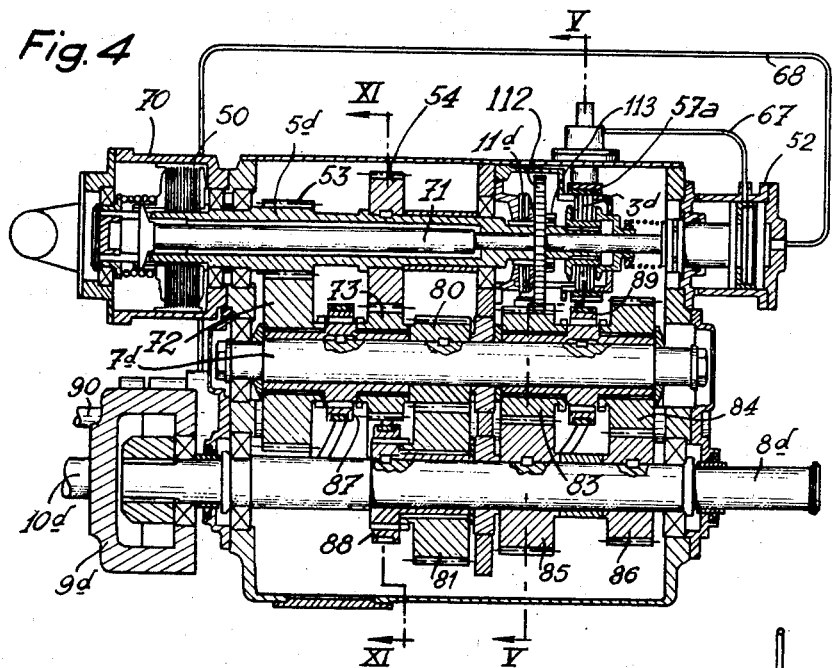
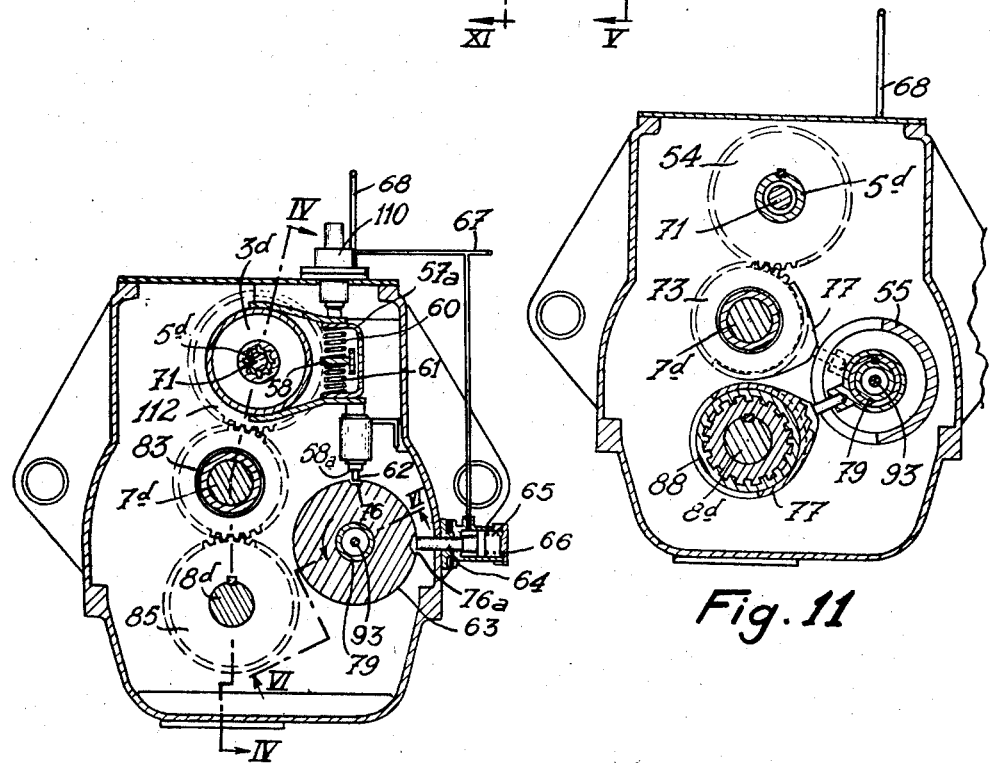

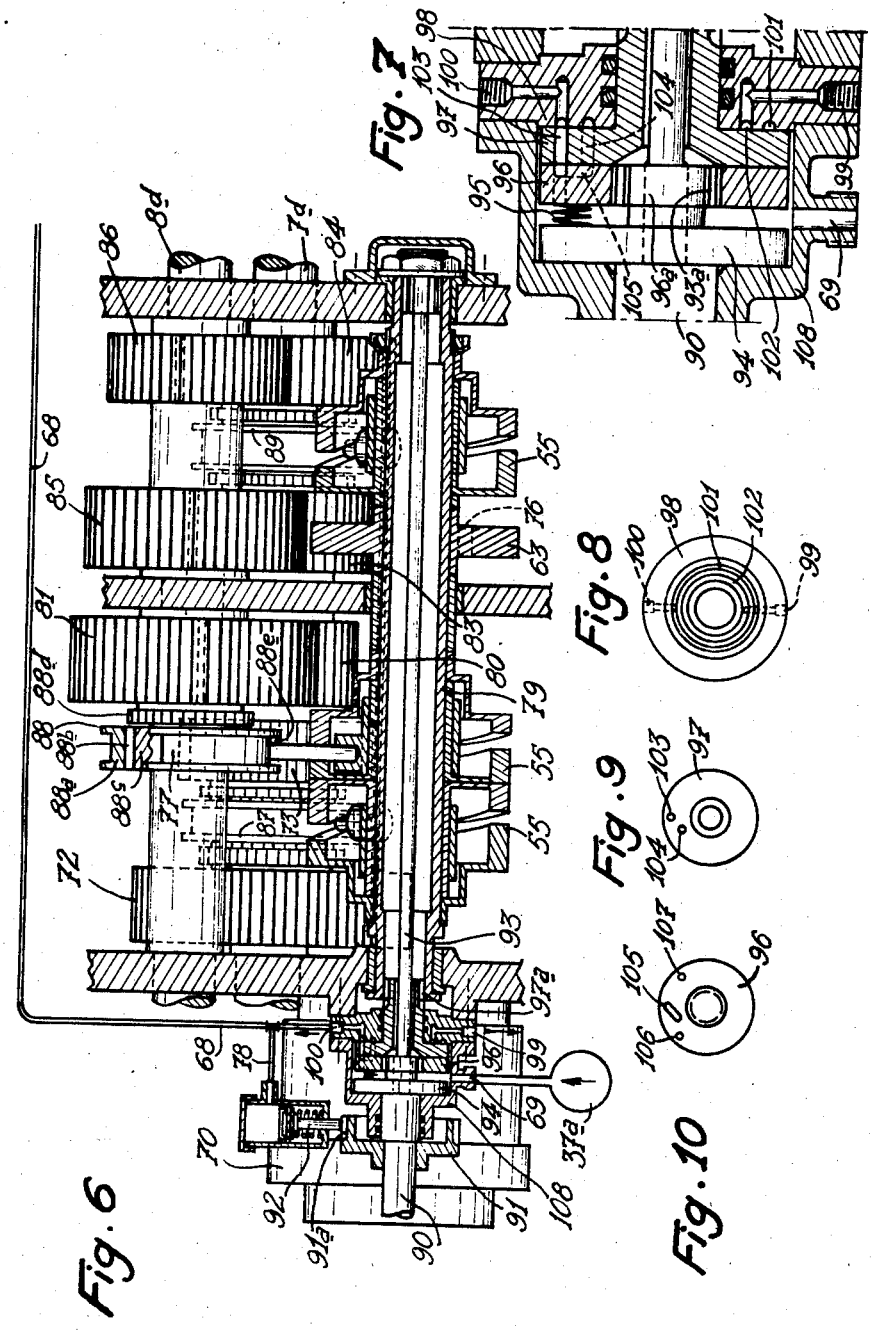

United States Patent Office 2,908,365
Patented Oct. 13, 1959

2,908,365
CHANGE SPEED MECHANISM IN GEAR BOXES
Pierre Marie Félix Zens and Michel Albert Jules Honnoré, Paris, France
Application March 29, 1955, Serial No. 497,772
Claims priority, application France March 31, 1954
10 Claims. (Cl. 192—4)

The present invention relates generally to power transmissions of the type employed in connection with automobile engines and the like, and more particularly to transmissions of the described character wherein different transmission ratios or speeds are obtained by selectively meshing corresponding sets of gears or pinions.

Change speed mechanisms for gear boxes or transmissions have been provided wherein a clutch and a brake are disposed between the engine shaft and the input shaft of the gear box or transmission and a clutch and a brake are also disposed between the output shaft of the transmission and the driven shaft of the vehicle, so that the input and output shafts of the transmission can be stopped, by uncoupling said shafts from the engine and driven shafts, respectively, and by applying the related brakes, preparatory to permitting actuation of the device controlling meshing of the speed change dogs. In such mechanisms the output shaft of the transmission and the clutch between the output and driven shafts must take up the torque applied to the input shaft as multiplied by the gear ratio which, in many cases, becomes prohibitive. Further, the existing mechanisms do not control the engagement of the clutches with respect to the relative speeds of the engine and vehicle so that, in many cases, engagement of the clutches occurs when there is a great disparity between such speeds and causes severe shocks to be imposed on the transmission. Finally, in the existing mechanisms, the change speed dogs can be actuated before the transmission is completely stopped and, consequently, clashing of the gears frequently occurs.

Accordingly, it is an object of the present invention to provide an improved change speed mechanism for transmissions of the described character wherein a clutch and a brake are disposed between the engine shaft and the input shaft of the transmission and free wheel means is disposed between the output shaft of the transmission and the driven shaft so that the free wheel means can take up the multiplied torque from the transmission without having to be excessively cumbersome and also functions to ensure that the engagement of the clutch will occur when the speed of the engine is in a suitable ratio to the speed of the vehicle to avoid subjecting the transmission to shocks when the clutch is engaged.

Another object is to provide a change speed mechanism for transmissions of the described character having a device which prevents actuation of the change speed dogs until the transmission is completely stopped.

A further object is to provide a change speed mechanism for transmission of the described character permitting slight rotation of the movable gears in response to friction, so long as the friction torque is less than a predetermined value, and also in response to the drag of the free wheel means during changes of speed or gear ratio, thereby to facilitate meshing of the movable gears with the fixed gears.

A still further object is to provide a change speed mechanism having the foregoing characteristics and which is pneumatically controlled for automatically achieving the desired functions.

In accordance with an aspect of the invention, the free wheel means between the output shaft of the transmission and the driven shaft of the vehicle may have a brake associated therewith to brake the drag of the free wheel means.

In order that the invention may be more clearly understood, illustrative embodiments thereof are hereinafter described in detail with reference to the accompanying drawings forming a part hereof, and wherein:

Figure 1 illustrates, diagrammatically, a change speed device for a gear box embodying the invention.

Fig. 2 is a diagrammatical view showing the brake reaction device adapted to release the gear box locking means of the device illustrated in Fig. 1, at the beginning of a change of speed.

Fig. 3 is a developed diagrammatical view of a special design of conjugate dog teeth.

Fig. 4 is a longitudinal section taken along the line IV—IV of Fig. 5, of a gear box of the kind diagrammatically illustrated in Fig. 1, in its neutral position.

Fig. 5 is a cross-section of Fig. 4 taken along the line V—V.

Fig. 6 is a longitudinal section on an enlarged scale of a part of the gear box illustrated in Figs. 4 and 5 taken along the line VI—VI, of Fig. 1g, which section is made in the plane of the axis of the shift mechanism and the axis of the output shaft.

Fig. 7 is a detail on a still greater scale of the pneumatic distributor valve of the shift mechanism illustrated in Fig. 6.

Figs. 8, 9 and 10 are front views on a smaller scale of the various discs of said distributor valve illustrated in Fig. 7.

Fig. 11 is a section of the gear box illustrated in Fig. 4 taken along the line XI—XI.

On the output shaft of a hydraulic coupling 1, the driving member of which is driven by an engine 2, is mounted a brake 3 for stopping the driven member of said coupling when the engine 2 is in the idling condition. A connecting shaft 4 extends from the output shaft of the coupling 1 to the input shaft 5 of a gear box 6 which input shaft carries pinions such as 5a. Said gear box comprises a lay shaft 7 carrying pinions such as 7a adapted to slide axially thereon or to be coupled thereto by a dog coupling device 6a in order to be alternately thrown into or out of gear with the pinions 5a for engaging the pinions corresponding to the particular gear chosen. In the illustrated example, pinions 7b of the lay shaft 7 are in meshing engagement with pinions 8a mounted on an output shaft 8 which carries a free-wheel coupling 9 having its driven member secured to a transmission or driven shaft 10.

The lay shaft 7 carries a small brake 11 adapted to brake the drag of the free wheel 9. The pinions 7a of the lay shaft 7 can be alternately thrown into or out of gear with the pinions 5a of the input shaft 5 through the action of a pneumatic control device such as may be constituted by ram cylinders 12 the piston 12a of which are operatively connected through their rods 12b, for example, to fork-carrying sliding rods such as 39 controlling the dog coupling devices 6a, a spring 13 acting to return each sliding rod to its initial position when the control pressure is no longer applied to the corresponding cylinder 12.

The link system through which the brakes 3 and 11 are actuated is operated by a pressure air ram cylinder 14. A ram cylinder 15 fed with pressure air simultaneously with the cylinder 14 moves the control means of the engine to the idling position at the same time as the brake 3 comes into action. For this purpose, the rod 48 of piston 15a is connected to a lever 47 which controls the throttle valve 46. Said lever 47 is connected to the throttle lever by means of a transmission 49.

The cylinders 14 and 15 are supplied with pressure air through a cock 16 provided with an outlet or opening 59 to the atmosphere and operated by a push-rod which is actuated by a cam 17 secured to a shaft 18 rotated by means of a control crank 19. Pressure air is fed to the cock 16 from a source 37 through a pipe 20 and passes from said cock into the pipe 21 which leads to the cylinders 14 and 15. The stationary member of the brake 3 is secured to an oscillating arm 22 (Fig. 2) which transmits the reaction torque to a resilient abutment stop 23 and operates, as said stop yields, to open a valve 24 connected to the source 37 through a pipe 58 and provided with an outlet 56 to the atmosphere. When said stop 23 is fully compressed, that is, when the braking torque transmitted to the stationary member of brake 3 is sufficiently high, said valve 24 feeds a conduit 25 which leads to a double valve 26 connected, on the one hand, through a pipe 27 to the cock 16 and, on the other hand, to a conduit 28 feeding a cylinder 29 for locking the gear box. The piston 30 of the cylinder 29 is connected through the rod 31 to a locking catch 32 adapted to engage in a notch 33 of the sliding rod 39 carrying the striker fork, controlling the dog coupling device 6a, which rod is actuated by a related ram cylinder 12. Through a slot 31a formed in the rod 31 is actuated a valve 34 by means of a crank lever 31b pivotally mounted at 31c. Said valve 34 is connected, on the one hand, to the air pressure source 37 through pipe 38 and, on the other hand, through a conduit 35 to a double valve 36 inserted in the pipe 21 between the cock 16 and the cylinders 14 and 15.

Besides the cam 17 for controlling the cock 16, the shaft 18 conveniently carries one or more other cams 114 adapted to actuate one or more cocks 115 connected, on the one hand, to a pipe 116 connected in turn to the air pressure source 37 and, on the other hand, to pipe or pipes 117 feeding the cylinder or cylinders 12 so that they operate in the direction required.

The above described device operates as follows:

When the driver desires to change gear, he turns the crank 19 which, through the cam 17, actuates the cock 16 so that:

Pressure air is delivered through the pipe 21 and the double valve 36 to the cylinder 15 which causes the engine to be throttled to the idling condition, and to the cylinder 14 which applies the brakes 3 and 11.

The conduit 27 is connected to exhaust, but as long as the reaction torque on the brake 3 is high, the valve 24 which connects pipes 38 and 25 under the action of arm 22, as illustrated in Fig. 2, operates to feed the cylinder 29 through the double valve 26, for maintaining the engaged gear locked through the piston 30 which pushes the catch 32 into the corresponding notch 33.

After the shaft 4 has been stopped, the reaction torque of the brake decreases and thus will reach such a value that the resilient stop 23 can push back in the direction of arrow f (Fig. 2) the arm 22 which by this movement operates the valve 24 so that pipe 25 is connected to atmosphere and the double valve 26 connects the cylinder 29 to exhaust through conduit 27, thus allowing the piston 30 to withdraw the catch 32 from the notch 33, whereby the engaged gear will be unlocked. The gear can then be changed by the action of the cylinder 12 which is fed during the rotation of the camshaft 18, the load of the cylinder on the related sliding rod 39 being arranged to be limited to a moderate value, in order to avoid unnecessary stresses in the pinion and dog teeth. When the catch 32 is out or released, the valve 34 under the action exerted by the slot 31a of rod 31 on the crank lever 31b will maintain, whatever the position of the cock 16, the supply to the cylinders 14 and 15 through the operation of the double valve 36. The gear shift may be effected without any risk and, even if the cock 16 has been returned to its initial position, the shafts 4, 5 and 7 will be held by the brakes 3 and 11 until the catch 32 is allowed to engage the corresponding notch 33. When this happens, the valve 34 is returned to the position illustrated in Fig. 1 and, through the double valve 36, connects the cylinders 14 and 15 to exhaust, thus releasing the brakes 3 and 11 and restoring the engine power. When the coupling 1 is of the hydraulic type, it automatically connects the engine to the shafts 4, 5, 7, 8 and to the driven shaft 10.

As such a device is adapted for meshing gear pinions or dog coupling members associated with two respective shafts, one of which is positively stopped by the brake 3 while the other may be allowed to rotate only with very low speed and torque under the action of the brake 11, which brakes the drag of the free wheel 9, a pre-engagement may be made by using on either engaging member only a small number of teeth. Fig. 3 diagrammatically illustrates an embodiment of such an arrangement applied to a pinion 5c fixed on the input shaft 5 and to a pinion 7c slidably mounted on the lay shaft 7 for engaging said pinion 5c, said pinions being provided with four teeth 42, 43, 44, 45 and 42a, 43a, 44a, 45a, respectively, longer than the normal teeth and having a shape which facilitates the pre-engagement. After such a pre-engagement, the opposite teeth are in such a relative position that only a slight effort is required for engaging the gear or dog teeth proper into a full-meshing. Such a slight effort will be sufficient since the gear shift cannot take place until after the corresponding shafts are fully or substantially stopped.

If the drag of the free-wheel coupling 9 is high, it may, since the braking action of the brake 11 is moderate, cause a residual rotation of the shaft 7, which facilitates the engagement of the cooperating teeth of a gear without any damage thereto. Moreover, the stationary disc of the brake 11 may be given a slight angular freedom, so that the shaft 7 also has the same angular freedom for facilitating tooth engagement.

The cams carried by the shaft 18 may be so designed and set as to obtain a change of gear for every half-turn of the crank 19.

Referring now to Fig. 4, there is illustrated with more detail and some modifications a gear box of the kind shown diagrammatically in Fig. 1. The output shaft of a hydraulic coupling or main clutch the driving member of which is connected to an engine as for coupling 1 of Fig. 1, is connected through a drum 70 and an intermediate clutch 50 to the input hollow shaft 5d of the gear box, through which hollow shaft extends the control rod 71 of the clutch 50. Said control rod 71 is actuated by a ram device 52 operated by air pressure. As usual, the shaft 5d carries pinions 53, 54 meshing with pinions 72, 73 mounted for loose rotation about a lay shaft 7d of the gear box and adapted to be coupled in turn to said lay shaft.

The lay shaft 7d has keyed thereto a pinion 80 meshing with a loose pinion 81 mounted on the output shaft 8d of the gear box, which shaft 8d is provided, in a way not shown in Fig. 4, with a free-wheel 9d or other coupling similar to the free-wheel coupling 9 of Fig. 1, which free-wheel is connected to the driven shaft 10d. The lay shaft 7d also carries two loose pinions 83, 84 permanently meshing with cooperating pinions 85, 86 keyed to the output shaft 82d. A dog coupling member 87 may engage either one of the pinions 72, 73 of the lay shaft 7d which are permanently in mesh with the pinions 53, 54 of the input shaft 5d. A dog coupling member 88 is adapted to connect the pinion 81 with the shaft 8d. Another dog coupling member 89 is adapted to connect the lay shaft with either one of the pinions 83, 84 when the dog coupling member 88 is out of gear. The forks 77 for controlling the various dog coupling members are actuated by grooved cams 55

(Fig. 6) the operation of which will be described in more detail hereafter.

Each dog coupling member 87, 88 or 89, as well known and as illustrated for the dog coupling member 88 in Fig. 6, comprises a crown member 88a internally formed with longitudinal splines adapted to engage either splines 88b formed on a member 88c keyed on shaft 7d or 8d, or splines 88d formed on an extension of pinion 72, 73, 81, 83 or 84, under the action of the corresponding fork 77 engaging an outer groove 88e of said member 88a.

The shaft 5d has secured thereto the movable linings of a brake 3d actuated through the ram 52, and the body of said brake is secured to a frame 57a provided with two springs 60, 61 abutting a projection 58 formed in the gear box structure (Fig. 5). Said frame 57a bears on a resilient catch 58a having an end pin 62 adapted to engage one of the notches 76 of a locking drum 63 connected to the cams 55 for driving the striker forks 77. The drum 63 may also be locked by another catch 64, retractable by a pneumatic ram 65 against the action of a catch spring 66, the notches 76a for receiving to the catch 64 in the drum 63 and the catch 64 itself having inclined engaging sides for locating the drum when the latter is being locked. The cylinder of the ram 65 is supplied with pressure air through a conduit 67 connected to the cylinder 52, the latter receiving pressure air through a conduit 68 for successively actuating the clutch 50 and the brake 3d, said conduit 68 leading from an air pressure source 37a through a connection 69 and the striker forks device illustrated in Figs. 6 to 10.

The gear shift takes place when a shaft 90 (Fig. 6) is rotated either manually or by telecontrolled motor means, said shaft rotating in a step-by-step manner through equal angles for each change of gear or transmission ratio. The shaft 90 has a locking drum 91 secured thereto and provided with notches 91a corresponding to the several fixed positions of the shaft and adapted to be engaged by a plunger catch 92 actuated by air pressure through a pipe 78 branching from the conduit 68. Said shaft 90 actuates a compressed air distributing valve shown in detail in Fig. 7 and is prolonged by a torsion bar 93 extending through a hollow shaft 79 carrying the cams 55 and the locking drum 63. The hollow shaft 79 is secured to the end of the torsion bar 93 remote from the end of the latter connected with the shaft 90. The shaft 90 carries a disc 94 having springs 95 abutting thereagainst. The springs 95 bear on a disc 96 which is mounted on a head 96a rigid with the torsion bar 93 and secured to that head, for example, as by splines 93a, so that the disc 96 is slidable relative to the torsion bar but held against rotation with respect to the latter. The hollow shaft 79 is connected in the same way, that is, by sliding splines 97a (Fig. 6), to a follow disc 97 located between the disc 96 and a stationary plate 98. The plate 98 has an exhaust orifice 99 and a distributing orifice 100 therein which open substantially in the radial direction, with the orifice 100 being connected to the conduit 68. The plate 98 further has a large diameter angular groove 101 formed in its inner face and connected to the orifice 100, and a smaller diameter annular groove 102 connected to the orifice 99. The follower disc 97 (Fig. 9) has two axially extending holes 103 and 104 extending therethrough and permanently communicating with the grooves 101 and 102, respectively. The disc 96 has an inclined slot 105 adapted to communicate the hole 103 with the hole 104, the slot 105 being merely formed in one face of the disc 96. At opposite sides of the slot 105, the disc 96 has two axial holes 106 and 107 extending therethrough (Fig. 10) disposed on a diameter equal to that of annular groove 101 and opening into a casing 108 which is provided with the previously mentioned connection port 69 permanently communicating with the source of pressure air 37a.

The above described mechanism operates as follows:

When it is desired to change gear or the transmission ratio, the shaft 90 is rotated against the opposing torsional stress of the bar 93, while the hollow shaft 79 carrying the cams 55 is held against rotation by the drum 63 engaged by the catch 64. Such rotation of the shaft 90 brings one of the holes 106 or 107 of the disc 96 into registration with the hole 103 of the follower disc 97 which is also held stationary. Pressure air fed through the port 69 then passes through the hole 106 or 107 and the registered hole 103 into the groove 101 and, from the latter, into the conduit 68 through the orifice 100. The catch 92 then becomes operative to lock the shaft 90 in the rotated position.

Pressure air fed to the conduit 68 displaces the piston 52a towards the left-hand side of Fig. 4 for releasing the clutch 50 which disconnects the shaft 5d from the engine and also from the driven member of the clutch associated with said engine. The other shafts of the gear box are also released, and, in particular, the shaft 8d cannot be driven by the driven shaft 10d, owing to the operation of the free-wheel 9d. At the same time, the brake 3d is actuated and thus absorbs the kinetic energy of the gear box rotating members. The reaction of said brake on the springs 60, 61 compresses the spring 61 and causes the catch pin 58a to engage one of the notches of the locking drum 63. When piston 52a uncovers the opening of pipe 57, pressure air is then fed to the side of the piston 65 opposite to the spring 66 so as to retract the catch 64. Any attempt to change gear tends to rotate the drum 63 in one or the other direction, and such rotation cannot occur until the catch pin 58a is retracted when the spring 61 expands and owing to the fact that brake 3d is operative thus initiates small amplitude oscillations of said brake 3d and the moving members associated with said brake, that is, the shaft 51, the pinions 53, 54 and the pinions meshing therewith. During said oscillations under the action of the torsion bar 93, the cams 55 pivot and the cooperating dog teeth oscillate in front of one another, so that they can be engaged as soon as they come in the proper relative position.

After the drum 63 has been released, it cannot be locked again by the catches engaging its notches 76 or 76a which correspond to each change of gear or transmission ratio until the gear shift operation has been completed. Simultaneously, the follower disc 97 rotates and thereby cuts off the pressure air supply while both of the holes 103 and 104 communicate with the slot 105 of the disc 96. Through such communication of the holes 103 and 104 with the slot 105, pressure air passes from the conduit 68 through the exhaust orifice 99. Under such conditions, the catch 92 is retracted, the catch 64 engages again a notch in the drum 63, thus locating the latter; the ram 52 operates to release the brake 3d and to allow the engagement of the linings of the clutch 50 together through the action of the clutch spring.

It will be appreciated that, with such a device, the speed changing operations may be accomplished safely, very rapidly and with very slight effort, thus permitting reduction of the cost of the gear boxes, since the pinions and dog coupling members may be designed to resist only the normal meshing stresses and since the shift control members may also be of cheaper construction as they are only subjected to the efforts required for simply displacing non rotating or substantially non rotating members.

For increasing the amplitude of the oscillations allowed by the springs 60, 61, the frame 57a may be vibrated by a pressure air hammer 110 connected to the conduit 68, said pressure air hammer being of a known type, in the illustrated gear box, it is also convenient to use the momentum of all the moving members for co-operating to cause the oscillations of the brake 3d. For this purpose, an auxiliary brake 11d may be associated to and actuated at the same time as the brake 3d. The stationary linings of said brake 11d bear against the box structure and the movable linings thereof are driven by an auxiliary pinion 112 loosely mounted on the shaft 51. On said pinion bear the linings of the brake 3d through a thrust ball bearing 113. The pinion 112 meshes with the pinion 83. Anyhow, said auxiliary brake 11d is capable, at least in the neutral gear position, to brake the shaft 8d and the moving members connected thereto when said shaft 82 is driven by the drag of the free-wheel 9d, which drag facilitates the relative movement of the teeth to be engaged.

Of course, the abutment members of the stationary linings of said brake 11d may have a determined angular freedom of movement which would permit the proper oscillations of the brake 3d.

It should be understood that various specific changes are possible, within the scope of the invention, from the constructions illustrated and described hereinabove. Thus, the hydraulic coupling 1 and/or the free-wheel coupling 9 may be replaced by any other suitable coupling devices; the gear box could be of any other type; the brake members could be controlled by individual means, the above described combination of semi-automatic control means being only for the purpose of facilitating and quickening the gear shift operation.

Moreover, the applications of such a change speed mechanism are not limited to vehicles propelled by thermal engines, but may extend to any cases where a change speed gear box with several gear combinations is to be used.

What we claim is:

1. In a speed changing mechanism for disposition between a prime mover and a driven shaft; the combination of an input shaft, coupling means for connecting said input shaft to the prime mover and capable of permitting rotation of the latter independent of said input shaft, an output shaft, free wheel means driven by said output shaft and adapted for connection to the driven shaft, transmission mechanism between said input and output shafts shiftable to provide different transmission ratios between the input and output shafts, shifting means operative to shift said transmission mechanism, braking means actuatable for braking rotation of said input shaft, locking means for preventing operation of said shifting means, control means for said locking means responsive to rotational forces acting on the braking means with the latter actuated to brake rotation of said input shaft to apply said locking means when said input shaft rotates and then to release said locking means when said input shaft is substantially stopped, actuating means for said shifting means, and means operating said braking means in accordance with the operation of said actuating means so that, upon operation of said actuating means, said shifting means becomes effective to shift said transmission mechanism only after said braking means has substantially halted rotation of said input shaft.

2. In a speed changing mechanism for disposition between a prime mover and a driven shaft; the combination as in claim 1, further comprising second braking means operated simultaneously with the first mentioned braking means to brake rotation of said output shaft.

3. In a speed changing mechanism for disposition between a prime mover and a driven shaft; the combination as in claim 2, further comprising means releasing said first and second braking means following operation of said shifting means.

4. In a speed changing mechanism for disposition between a prime mover and a driven shaft; the combination as in claim 1, further comprising means operative to cause idling of the prime mover, and means operating said idling means with said braking means.

5. In a speed changing mechanism for disposition between a prime mover and a driven shaft; the combination as in claim 4, wherein said coupling means is an hydraulic coupling transmitting rotation of the prime mover to said input shaft during normal operation of the prime mover and permitting braking of said input shaft independent of the prime mover during idling of the latter.

6. In a speed changing mechanism for disposition between a prime mover and a driven shaft; the combination as in claim 1, wherein said coupling means includes a normally engaged friction clutch, and further comprising means disengaging said clutch with the operation of said braking means.

7. In a speed changing mechanism for disposition between a prime mover and a driven shaft; the combination as in claim 6, further comprising means operative to cause idling of the prime mover, and means operating said idling means with the operation of said braking means and the disengagement of said clutch.

8. In a speed changing mechanism for disposition between a prime mover and a driven shaft; the combination of an input shaft, normally engaged clutch means for connecting said input shaft to the prime mover, an output shaft, free wheel means driven by said output shaft and adapted for connection to the driven shaft to drive the latter, transmission mechanism between said input and output shafts shiftable to provide different transmission ratios between said input and output shafts, braking means associated with said clutch means to brake the rotation of said input and output shafts and of said transmission mechanism when said clutch means is disengaged, transmission shifting means, means for locking said transmission shifting means against operation during the transmission of rotation from said input shaft to said output shaft by said transmission mechanism in each of said transmission ratios, means for causing idling of the prime mover, actuating means for disengaging said clutch means, operating said braking means and idling means and releasing said locking means, safety means responsive to the reaction torque of said braking means and preventing operation of said transmission shifting means so long as said reaction torque exceeds a predetermined value so that, following the operation of said actuating means, shifting of said transmission mechanism can occur only after said braking means has substantially brought said input and output shafts and said transmission mechanism to a halt, and means automatically rendering said actuating means inoperative following operation of said shifting means to shift said transmission mechanism.

9. In a speed changing mechanism for disposition between a prime mover and a driven shaft; the combination as in claim 8, wherein said transmission shifting means includes a rotatable cam shaft, and wherein said safety means includes an angularly movable frame connected to said braking means and subjected to the reaction torque of the latter, resilient means resisting angular displacement of said frame, a latch actuated by angular displacement of said frame, and a disc on said cam shaft having peripheral notches corresponding to the transmission ratios of said transmission mechanism and adapted to receive said latch so that when said braking means is operated, said frame is angularly displaced to engage said latch in one of said notches by reason of the initially relatively high reaction torque of said braking means, thereby to prevent rotation of said cam shaft, and, thereafter, when said reaction torque decreases as the input and output shafts are braked to substantially a complete halt, said resilient means oscillates said frame to disengage said latch from said disc, while the oscillations of said frame are transmitted, by said braking means, to said transmission mechanism for facilitating shifting of the latter.

10. In a speed changing mechanism for disposition between a prime mover and a driven shaft; the combination as in claim 1, wherein the means responsive to the speed of rotation of the input shaft comprises means responsive to the reaction of the braking torque of the braking means to apply and release the locking means when said reaction exceeds a predetermined value and falls below said value, respectively, and a connecting device between the braking means and said means responsive to the reaction of the braking torque.

References Cited in the file of this patent

UNITED STATES PATENTS

| | | |
|---|---|---|
| 1,403,819 | Stowers et al. | Jan. 17, 1922 |
| 1,541,240 | Barkeij | June 9, 1925 |
| 2,653,690 | Saracchi | Sept. 29, 1953 |